United States Patent
Hoppe et al.

(10) Patent No.: US 11,738,454 B2
(45) Date of Patent: Aug. 29, 2023

(54) METHOD AND DEVICE FOR OPERATING A ROBOT

(71) Applicant: Robert Bosch GmbH, Stuttgart (DE)

(72) Inventors: Sabrina Hoppe, Tiefenbronn (DE); Markus Giftthaler, Freising (DE); Robert Krug, Neu-Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 220 days.

(21) Appl. No.: 17/325,181

(22) Filed: May 19, 2021

(65) Prior Publication Data

US 2021/0379759 A1 Dec. 9, 2021

(30) Foreign Application Priority Data

Jun. 3, 2020 (DE) .................... 102020206913.1

(51) Int. Cl.
*B25J 9/16* (2006.01)
*B25J 15/08* (2006.01)

(52) U.S. Cl.
CPC .............. *B25J 9/163* (2013.01); *B25J 9/161* (2013.01); *B25J 9/1633* (2013.01); *B25J 9/1664* (2013.01); *B25J 15/08* (2013.01)

(58) Field of Classification Search
CPC . B25J 9/163; B25J 9/161; B25J 9/1633; B25J 9/1664; B25J 15/08; B25J 9/1656; B25J 19/00; B25J 9/1628; B25J 13/085; B25J 9/1653; B25J 9/1661; B25J 9/1687; G05B 2219/33056; G05B 2219/40032; G05B 13/027; G05B 13/0285;

(Continued)

(56) References Cited

U.S. PATENT DOCUMENTS

2019/0250568 A1* 8/2019 Li ...................... G05B 13/027
2019/0354813 A1* 11/2019 Riedmiller ............... G06N 3/08

(Continued)

FOREIGN PATENT DOCUMENTS

DE 102014212747 A1 1/2016
DE 202016004627 U1 9/2016

(Continued)

OTHER PUBLICATIONS

Lillicrap et al., "Continuous Control With Deep Reinforcement Learning," Cornell University, 2015, pp. 1-14. arXiv:1509.02971.

*Primary Examiner* — Abby Y Lin
*Assistant Examiner* — Esvinder Singh
(74) *Attorney, Agent, or Firm* — Norton Rose Fulbright US LLP; Gerard Messina (57) ABSTRACT

Device and method for operating a robot. As a function of a first state of the robot and/or its surroundings and as a function of an output of a first model, a first part of a manipulated variable for activating the robot for a transition from the first state into a second state of the robot is determined. A second part of the manipulated variable is determined as a function of the first state and regardless of the first model. A quality measure is determined as a function of the first state and of the output of the first model using a second model. A parameter of the first model is determined as a function of the quality measure. A parameter of the second model is determined as a function of the quality measure and a setpoint value. The setpoint value is determined as a function of a reward.

16 Claims, 3 Drawing Sheets

(58) Field of Classification Search
CPC ........ G05B 13/029; G05B 2219/25255; G05B 2219/32335; G05B 2219/33027; G05B 2219/33044; G05B 2219/39373; G05B 2219/40318; G05B 2219/32334; G05B 2219/45055; G05B 2219/39271; G05B 2219/32301; G05B 2219/40499; G06N 3/02; G06N 3/045; G06N 7/023; G06N 3/084; G06N 5/01
See application file for complete search history.

(56) References Cited

U.S. PATENT DOCUMENTS

| | | | | |
|---|---|---|---|---|
| 2020/0030970 | A1* | 1/2020 | Mariyama | G06N 3/006 |
| 2020/0293883 | A1* | 9/2020 | Budden | G06N 3/088 |
| 2021/0232922 | A1* | 7/2021 | Zhang | G06F 18/214 |
| 2021/0350049 | A1* | 11/2021 | Zadorojniy | G06N 3/006 |

FOREIGN PATENT DOCUMENTS

| | | |
|---|---|---|
| DE | 202017102235 U1 | 5/2017 |
| DE | 102016014264 A1 | 7/2017 |
| DE | 102018006946 A1 | 12/2018 |
| DE | 202019100641 U1 | 2/2019 |
| DE | 102017218889 A1 | 4/2019 |
| DE | 202019103046 U1 | 6/2019 |
| DE | 102018201411 A1 | 8/2019 |
| DE | 102019122790 A1 | 2/2020 |

* cited by examiner

METHOD AND DEVICE FOR OPERATING A ROBOT

CROSS REFERENCE

The present application claims the benefit under 35 U.S.C. § 119 of German Patent Application No. DE 102020206913.1 filed on Jun. 3, 2020, which is expressly incorporated herein by reference in its entirety.

FIELD

The present invention is directed to a method and a device for operating a robot.

BACKGROUND INFORMATION

Robots are used in a variety of industrial applications. Strategies for movements which a robot may execute in an application are predefined by regulators in a closed control loop or by agents, which learn and predefine a strategy as a function of or independently of a model.

SUMMARY

An application improved over conventional applications is enabled by the device and the method according to the present invention.

In accordance with the present invention, a method is provided for operating a robot. In accordance with an example embodiment of the present invention, as a function of a first state of the robot and/or its surroundings and as a function of an output of a first model, a first part of a manipulated variable for activating the robot for a transition from the first state into a second state of the robot being determined, a second part of the manipulated variable being determined as a function of the first state and independently of the first model, a quality measure being determined as a function of the first state and as a function of the output of the first model using a second model, at least one parameter of the first model being determined as a function of the quality measure, at least one parameter of the second model being determined as a function of the quality measure and a setpoint value, the setpoint value being determined as a function of a reward which is associated with the transition from the first state into the second state. A particularly effective residual policy leading to the goal is thus used to activate the robot without divergences interfering with the learning process occurring.

It may be provided that at least one force and at least one moment are determined which act on an end effector of the robot, the first state and/or the second state being determined as a function of the at least one force and the at least one moment.

The first state and/or the second state is preferably defined with respect to an axis, a force causing a movement of the end effector in the direction of the axis, a moment causing a rotation of the end effector around the axis. This activation is particularly efficient for exploration and industrial use. The exploration, i.e., in particular randomly testing out new actions, thus becomes safer. It may be ensured that neither robot nor manipulation object nor surrounding humans are damaged.

It may be provided that a vector is determined which defines a constant part of the manipulated variable, the vector defining a first force, a second force, a third force, a first moment, a second moment, and a third moment, different axes being defined for the forces, a different one of the different axes being associated with each moment. The vector is particularly well-suited for describing the states and for the activation.

The first model may include a first function approximator, in particular a first Gaussian process or a first artificial neural network, a first part of the vector defining an input for this purpose, the input being defined regardless of a second part of the vector.

The second model may include a second function approximator, in particular a second Gaussian process or a second artificial neural network, the vector defining the input for this purpose.

In accordance with an example embodiment of the present invention, it may be provided that a vector is determined which defines the manipulated variable, the vector defining a first force, a second force, a third force, a first moment, a second moment, and a third moment, different axes being defined for the forces, a different one of the different axes being associated with each moment, a first part of the vector being defined independently of an output of the first artificial neural network which encompasses the first model, in particular being defined constantly, a second part of the vector being defined as a function of the output of the first artificial neural network. The robot is thus activatable in a predefined manner using constant variables and is thus movable faster into an end state depending on the task.

The end effector preferably includes at least one finger, which includes a section complementary to a workpiece, the surface of which is designed to be nonslip or self-centering. A particularly good hold is thus enabled.

In accordance with an example embodiment of the present invention, the setpoint value may be determined as a function of a barrier, the barrier being determined as a function of a graph in which a node defines a state of the robot, a subgraph of the graph being determined as a function of the first state, which encompasses a first node that represents the first state, the barrier being determined as a function of values which are associated with the nodes of the subgraph which encompasses a path from the first node to a second node, which represents an end state for the robot. In the subgraph, Q values associated with this are analytically determinable. These Q values may be used as lower barriers.

The graph is preferably determined as a function of at least one condition of the robot, an edge which defines an action without consequences being associated for a node which represents a leaf in the graph and which is not associated with an end state of the robot. A cause of divergences in the learning process is thus avoided.

The action without consequences may be associated with a constant value in particular for the first part of the manipulated variable. Barriers particularly well-suited for avoiding divergence in the learning process are thus determined. In certain cases, a barrier may only be determined at all by inserting the action without consequences; in other cases, a higher lower barrier may possibly be determined than without action without consequences.

The setpoint value is preferably determined as a function of a predefined barrier. Domain knowledge may thus be taken into consideration depending on the task.

For a training of the first artificial neural network, a cost function may be determined as a function of an output of the second artificial neural network, parameters of the first artificial neural network being learned in the training, for which this cost function has a smaller value than for other parameters.

In a training for the second artificial neural network, a cost function may be defined for an output of the second artificial neural network as a function of the output of the second artificial neural network and the setpoint value, parameters of the second artificial neural network being learned for which the cost function has a smaller value than for other parameters.

In accordance with the present invention, a device for operating a robot is provided. In accordance with an example embodiment, the device is designed to carry out the example methods disclosed herein.

Further advantageous specific embodiments result from the description below and the figures.

DETAILED DESCRIPTION OF EXAMPLE EMBODIMENTS

Figure 1:
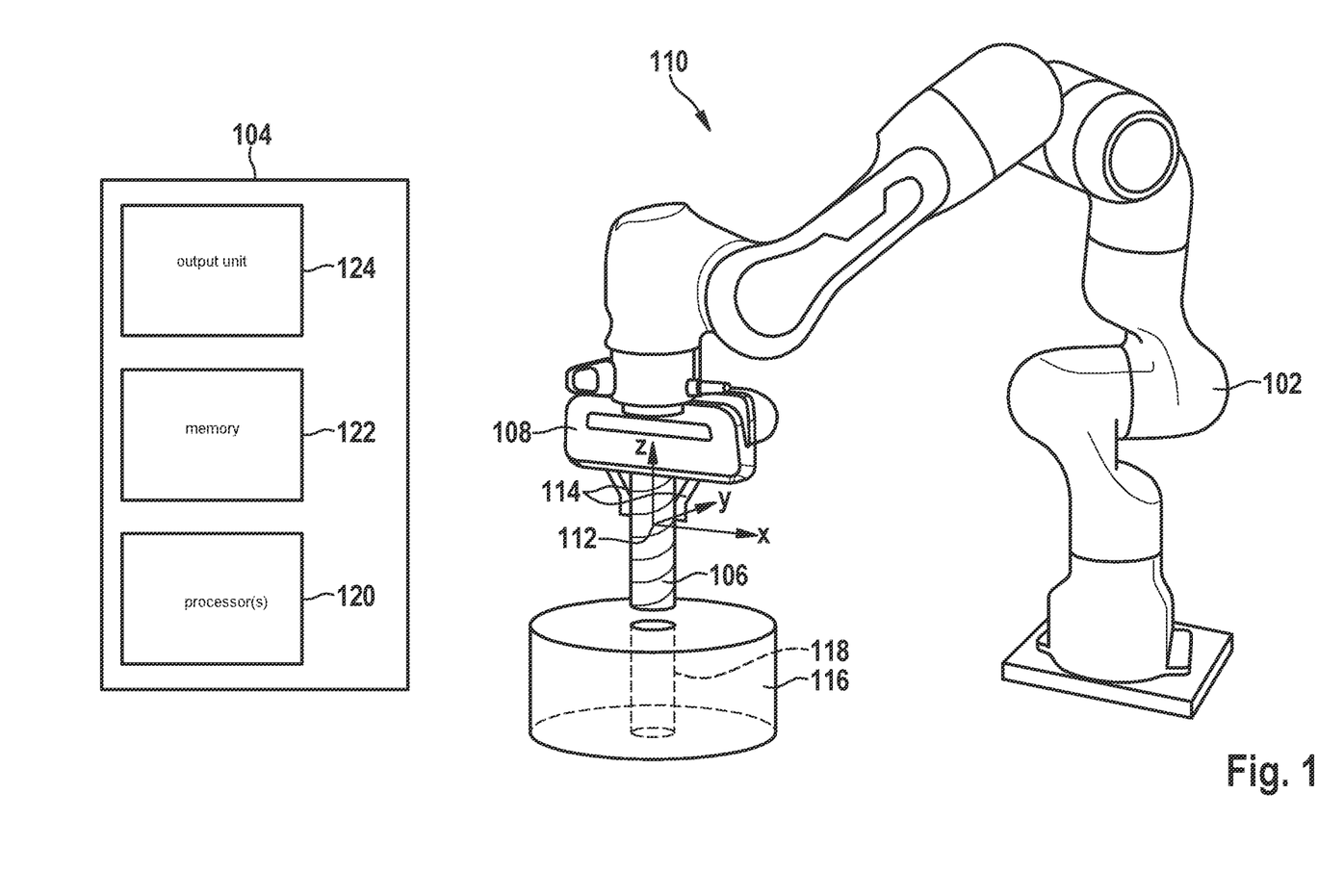
FIG. 1 shows a schematic illustration of a robot and a device for operating the robot, in accordance with an example embodiment of the present invention.

FIG. 1 schematically shows a robot 102 and a device 104 for operating robot 102. Robot 102 is designed to grip a first workpiece 106 using an end effector, in the example a gripping device 108. Robot 102 is movable in a workspace 110 into a plurality of different poses p. In the example, a pose p may be specified as a function of a three-dimensional Cartesian coordinate system. An origin 112 of the coordinate system is situated in the example in the center between two fingers 114 of gripping device 108, using which first workpiece 106 may be gripped. Other arrangements of the Cartesian coordinate system are also possible.

The Cartesian coordinate system defines a position for a movement in workspace 110 using coordinates x, y, z.

A second workpiece 116 is shown in workspace 110 in FIG. 1. In the example, an opening 118 is provided in second workpiece 116, which is designed to accommodate first workpiece 106.

For example, first workpiece 106 is a shaft, in particular a motor shaft. For example, second workpiece 116 is a ball bearing which is designed to accommodate the shaft. The ball bearing may be situated in a motor housing.

Robot 102 is designed to move first workpiece 106 on a trajectory according to a strategy in workspace 110 in such a way that first workpiece 106 is accommodated in second workpiece 116 at the end of the trajectory.

Device 104 includes at least one processor 120 and at least one memory 122 for instructions, upon the execution of which by the at least one processor 120, a method described hereinafter runs. At least one graphics processing unit may also be provided, using which a function approximator, in particular an artificial neural network, may be trained particularly efficiently. The at least one processor 120 and the at least one memory 122 may be designed as one or multiple microprocessors. Device 104 may be situated outside robot 102 or integrated in robot 102. Data lines may be provided for communication between processor, memory, activation unit, and robot 102. These are not shown in FIG. 1.

Device 104 may include an output unit 124, which is designed to activate robot 102. Output unit 124 may include an end stage or a communication interface for activating one or multiple actuators of robot 102.

Figure 2:
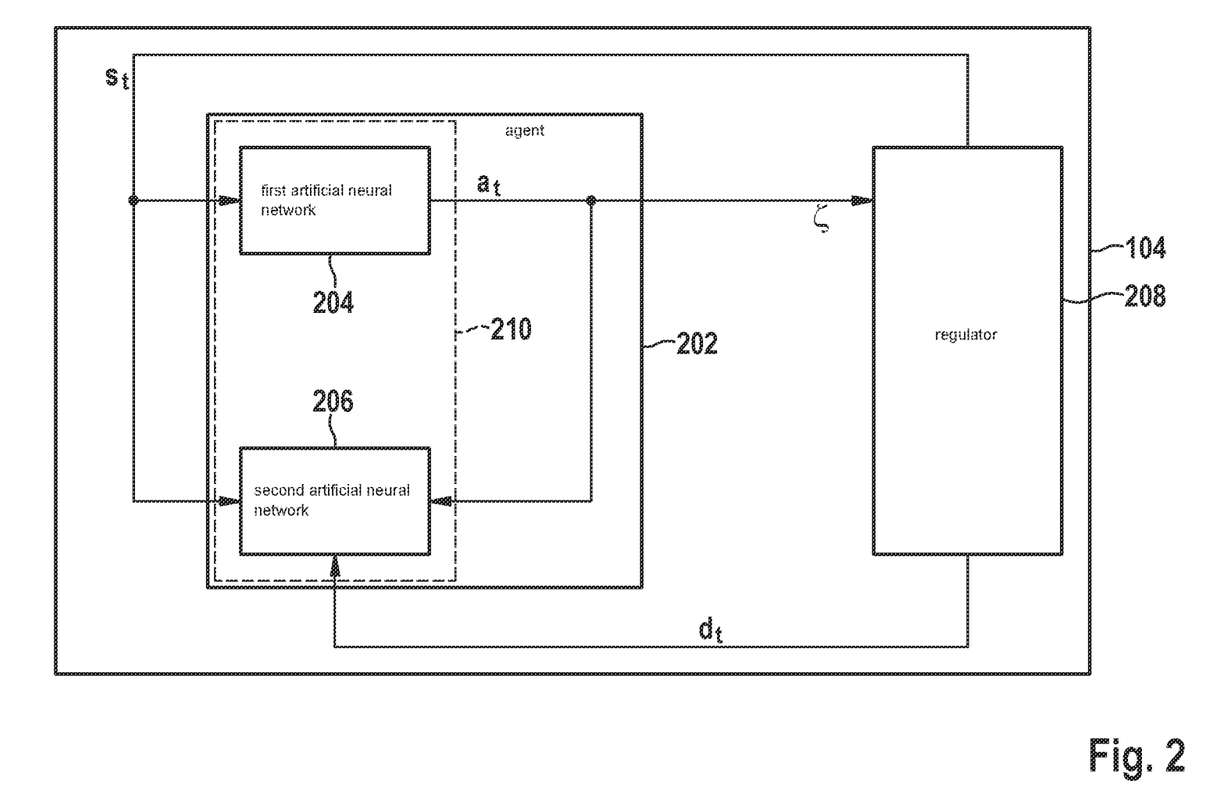
FIG. 2 shows a schematic illustration of a part of the device, in accordance with an example embodiment of the present invention.

FIG. 2 schematically shows a part of device 104.

Device 104 includes an agent 202, which is autonomous in particular and is designed to interact with its surroundings.

For each discrete time step t, agent 202 may observe a state $s_t$ and execute an action $\alpha_t = \pi(s_t)$, which defines next state $s_{t+1}$, as a function of a strategy $\pi$. After each action, agent 202 receives a reward $r_t = \mathcal{R}(s_t, \alpha_t, s_{t+1})$.

The surroundings are represented in this example by a Markov decision process including states, actions, transition dynamics, and a reward function. The transition dynamics may be stochastic.

An expected value $\mathbb{E}$ for a total of future rewards $r_i$, which is reached when strategy $\pi$ is followed starting from a state s, is defined by a result $R_s^\pi = \mathbb{E} \sum_i^T \gamma^{i-1} r_i$, including a factor $\gamma \in [0,1)$.

For a behavior independent in a first step from strategy $\pi$, a Q value may be taken into consideration. The Q value may be considered as an expected value for a sum of the future rewards which are achieved if an action $\alpha_t$ is carried out at an instantaneous time step t and from then strategy if is followed:

$$Q^\pi(s_t, \alpha_t) = \mathcal{R}(s_t, \alpha_t, s_{t+1}) + \gamma R_s^\pi$$

The goal which agent 202 pursues is to determine an optimum strategy $\pi^*$ for reaching a final state. It may be provided that a specification $d_t$ is determined which indicates whether or not robot 102 has fulfilled its task, i.e., has reached the end state. Optimum strategy e selects action $\alpha_t$ for each present state $s_t$ which maximizes an expected reward over all future states with respect to present state $s_t$. Expected rewards of future states are taken into consideration in the example weighted with a deduction $\gamma$ in a sum of the future states which defines the expected reward.

Agent 202 may achieve this in that a Q function for the surroundings is determined and actions $\alpha_t$ are selected which maximize the Q value of the Q function at each time step t.

Q function $Q_{target}$ is used for an optimization of the function approximator and may be determined, for example, by an estimation of the Q value as a function of experience and an instantaneous estimation of the Q function:

$$Q_{target}(s_t, a_t) = \begin{cases} r_t, & \text{if } s_{t+1} \text{ is an end state} \\ r_t + \gamma Q(s_{t+1}, \pi(s_{t+1})), & \text{else} \end{cases}$$

This is referred to as temporal difference learning. It may be provided that it is determined as a function of specification $d_t$ whether state $s_{t+1}$ is an end state.

These functions may be approximated by artificial neural networks. For example, two artificial neural networks are used.

One first artificial neural network 204 represents deterministic strategy $\pi$. First artificial neural network 204 is referred to as an actor network. Second artificial neural network 206 determines a Q value as a function of a pair of state $s_t$ and action $\alpha_t$ at its input. Second artificial neural network 206 is referred to as a critic network. This procedure is referred to as Deep Deterministic Policy Gradients and is described, for example, in T. P. Lillicrap, J. J. Hunt, A. Pritzel, N. Heess, T. Erez, Y. Tassa, D. Silver, and D.

Wierstra, "Continuous control with deep reinforcement learning," arXiv preprint arXiv:1509.02971, 2015.

Deep deterministic policy gradients is a model-free method for continuous state and action spaces. To avoid instabilities in a learning process using nonlinear neural networks, barriers may be determined for the Q values. These barriers are used during the learning process, by which the learning process remains stable.

In the learning process, data about the interaction of the agent with the surroundings are stored in a replay memory. Instead of storing a list $(s_t, \alpha_t, s_{t+1}, r_t; d_t)$ of transitions, reward, and the specification as to whether or not the end state was reached in the replay memory, these are processed as follows. It is also possible to store the list and then continuously derive a new graph from the list. In the example, a transition includes a state $s_t$, an action $\alpha_t$, a state $s_{t+1}$ achieved by executing action $\alpha_t$ in state $s_t$. Reward $r_t$ thus achieved and specification $d_t$ relate to this transition. Instead of the list of the transitions, a data graph is provided in which a first node defines state $s_t$ and a second node defines state $s_{t+1}$ achieved by executing action $\alpha_t$ in state $s_t$. An edge in the graph between the first node and the second node defines in this case action $\alpha_t$. Reward $r_t$ and specification $d_t$ are associated with the edge. Various transitions in the data graph may result with different probability in a divergence of the learning process. For temporal difference learning, the probability is a function of a structure of the data graph.

A probability that a transition, using which an end state is reached, generates a divergence, is lowest in relation to the probabilities for other transitions, using which no end state is reached. A probability that a state $s_t$ from which an end state is achievable via a path in the graph results in a divergence of the learning process, is less than the probability that a divergence in the learning process results due to a state $s_t$, from which an end state is not achievable in the graph.

Lower barriers may be determined starting from data graphs. For example, a subgraph of the data graph is determined, using which, under the assumption that the subgraph is complete, all Q values associated with the subgraph are analytically determinable. These Q values may be used as lower barriers for the data graph. Further lower and upper barriers may be defined a priori, i.e., by domain knowledge, for example about robot 102, first workpiece 106, second workpiece 116, and/or the object to be achieved and/or the reward function used.

One possibility for using the barriers is to limit the Q function as a function of the lower barrier LB and the upper barrier UB. The Q function results therefrom:

$$Q_{target}(s_t, \alpha_t) = \min(UB, \max(LB, Q_{target}(s_t, \alpha_t)))$$

In a training for second artificial neural network 206, a cost function may be defined as a mean squared error for an output of second artificial neural network 206 $Q(s_t, \alpha_t)$:

$$(Q(s_t, \alpha_t) - Q_{target}(s_t, \alpha_t))$$

The goal of the training in the example is to learn parameters of second artificial neural network 206 for which the cost function has a lesser value than for other parameters. This cost function is minimized, for example, in a gradient descent method.

It may be provided that nodes in the data graph, from which no edges originate that define an action $\alpha_t$, are provided with actions without consequences, i.e., zero actions. Other nodes may also be provided with actions without consequences. In the example, an action without consequences is an action which leaves the state of robot 102 unchanged, for example, in that an acceleration of zero is predefined.

Leaves in the data graph are thus avoided from which an action no longer originates. A lower barrier may be determined for each transition which ends in an infinite loop. An increased number of lower barriers are determinable by actions without consequences than without them. It is thus possible that the lower barriers become closer overall.

In the example, a first part of the variables which define state $s_t$ are used as the input for first artificial neural network 204. Input of first artificial neural network 204 is independent of a second part of the variables which define state $s_t$.

The variables may be estimated variables $\hat{\zeta} = [\hat{f}_x, \hat{f}_y, \hat{f}_z, \hat{\tau}_x, \hat{\tau}_y, \hat{\tau}_z]$. The variables may also be measured variables or computed or estimated as a function of measured variables.

In the example, a state $s_t$ is defined by an estimated force in x direction $\hat{f}_x$, an estimated force in y direction $\hat{f}_y$, an estimated force in z direction $\hat{f}_z$, an estimated moment $\hat{\tau}_x$ of a rotation around an axis extending in the x direction, an estimated moment $\hat{\tau}_y$ of an axis extending in the y direction, and an estimated moment $\hat{\tau}_z$ of a rotation around an axis extending in the z direction, which occur in an instantaneous pose p at gripping device 108. In the example, the input of first artificial neural network 204 is determined independently of estimated force $\hat{f}_x$, estimated force $\hat{f}_y$, and independently of estimated moments $\hat{\tau}_z$. This second part of the variables is not used in the example as an input for first artificial neural network 204. This reduces the dimensionality and therefore ensures that first artificial neural network 204 becomes smaller and may therefore be trained faster or more easily. In other applications, these variables could be determined and used for this purpose, other variables not being used. This is particularly advantageous for a movement of robot 102 in which first workpiece 106 is inserted into opening 118, which extends in the z direction.

In the example, an action $\alpha_t$ is defined by a first part, which is constant in particular, and a second part. In the example, the first part defines, for a movement of gripping device 108, a force in x direction $f_x$, a force in y direction $f_y$, a force in z direction $f_z$, and a moment $\tau_z^r$ for a rotation around the axis extending in the z direction. Force $f_z$ may be $f_z = -15N$. In the example, this means that robot 102 continuously moves gripping device 108 along the z axis of gripping device 108. In the example, the second part defines a first setpoint value for a moment $\tau_x^r$ for a rotation around the axis extending in the x direction and/or a second setpoint value for a moment $\tau_y^r$ around the axis extending in the y direction. In the example, the first setpoint value is determined as a function of a first output variable of first artificial neural network 204. In the example, the second setpoint value is determined as a function of a second output variable of first artificial neural network 204. In the example, each of these output variables is scaled to an interval of $[-3, 3]$ Nm.

Overall, in the example a manipulated variable $\zeta = [f_x, f_y, f_z, \tau_x^r, \tau_y^r, \tau_z^r]$ is determined as action $\alpha_t$. In the example, in first part $f_x = f_y = 0$, $f_z = -15N$, $\tau_z^r = 0$. The first part may also provide other values. Manipulated variable $\zeta$ may also be constructed differently if robot 102 is to be activated in another way. Manipulated variable $\zeta$ is output in the example at a regulator 208 for setting a new pose p of gripping device 108, which activates robot 102 until new pose p is reached. An action $\alpha_t$ is ended in the example when regulator 208 for gripping device 108 has reached a stable state, for example at velocities below a predefined limit velocity. It may be provided that regulator 208 is designed to determine state $s_t$ of robot 102. It may be provided that regulator 208 is designed to set specification $d_t$, that robot 102 has reached the end state, to a first value, for example 1. It may be provided that specification $d_t$ is initialized using another value or otherwise set to another value, for example 0. The velocity for the determination of specification $d_t$ may be measured, calculated from measured variables, or estimated.

Robot 102 thus exerts a constant force on first workpiece 106 in the z direction, using which workpiece 106 is moved in the z direction. Robot 102 is moved by moments in the x direction and the y direction with respect to gripping device 108.

One example of another application is a movement of robot 102 in which first workpiece 108 is to be screwed into opening 118. In this case, a continuous rotational movement around the axis extending in the z direction may be reasonable. This may be taken into consideration in that the input of first artificial neural network 204 is determined independently of the estimated force in x direction $\hat{f}_x$, independently of the estimated force in y direction $\hat{f}_y$, independently of the estimated force in z direction $\hat{f}_z$, as a function of estimated moment $\hat{\tau}_x$, as a function of estimated moment $\hat{\tau}_y$, and independently of estimated moment $\hat{\tau}_z$. The first output of first artificial neural network 204 may in this case be a first setpoint value for moment $\tau_x^r$. The second output of first artificial neural network 204 may in this case be a second setpoint value for moment $\tau_y^r$. The other variables for the determination of manipulated variable $\zeta=[f_x\ f_y\ f_z\ \tau_x^r\ \tau_y^r\ \tau_z^r]$ are determined in this case independently of first artificial neural network 204.

Reward $r_t$ may be predefined by a first reward function which associates a value for reward $r_t=0$ with a transition to an end state and associates a value for reward $r_t=-1$ with each other transition.

Reward $r_t$ may be predefined by a second reward function, which associates a value with a transition as a function of a distance of instantaneous pose p of gripping device 108 and a pose p of gripping device in an end state. The end state is reached in the example when second workpiece 116 receives first workpiece 106 in opening 118 provided for this purpose.

In the example, for this purpose a first reward $r_P$ is determined as a function of a position error $\Delta^P$. In the example, position error $\Delta^P$ is determined as an l² norm of a Euclidean difference vector. The difference vector is determined, for example, from the position from instantaneous pose p of gripping device 108 and the position from pose p of gripping device 108 in the end state. In the example, for this purpose a second reward $r_R$ is determined as a function of an orientation error $\Delta^R$. In the example, orientation error $\Delta^R$ is determined as an l² norm of an angle error for a rotation with respect to the x axis and an angle error for a rotation with respect to the y axis between the orientation from instantaneous pose p of gripping device 108 and the orientation from pose p of gripping device 108 in the end state. In the example, the rotation with respect to the z axis is not taken into consideration. The rotation with respect to the z axis may be taken into consideration in other stated objects.

In the example, the second reward function is determined:

$$r_t = r_P + r_R = \frac{1}{2}\left(\exp\left(-\frac{\Delta^P}{\sigma^P}\right) + \exp\left(-\frac{\Delta^R}{\sigma^R}\right)\right) - 1$$

using a settable first parameter $\sigma^P=0.015$ and a settable second parameter $\sigma^R=0.7$. Reward $r_t$ thus remains in an interval $[-1,0]$ in the example.

In such an arrangement, it is easily possible that divergences occur in the learning process, since large path lengths between a starting state and the end state occur in the associated data graph.

In order to avoid these divergences in the learning process, i.e., in the training, it is provided that actions without consequences and additional upper barriers UB and lower barriers LB are used in the learning process. Upper barriers UB and lower barriers LB are defined in the example as a function of a minimum reward and a maximum reward. In the example, a lower barrier $$\frac{-1}{1-\gamma}$$

and an upper barrier 0 are provided for Q function $Q_{target}$, for which the following applies:

$$\frac{-1}{1-\gamma} \leq Q_{target} \leq 0$$

The actions without consequences are defined in the example for the second part of the manipulated variable. In the example, $\tau_x^r=0$, $\tau_y^r=0$ are defined as the action without consequences. The actions without consequences may also be defined in other scenarios for other parts of the manipulated variable.

In the example, a learning unit 210 is provided, which is designed to determine reward $r_t$ as a function of at least one of the reward functions. Learning unit 210 is designed in the example to determine a value of Q function $Q_{target}$. It may be provided that learning unit 210 is designed to evaluate specification $d_t$, and to determine the value of Q function $Q_{target}$ as a function of a value of specification $d_t$ either independently of the Q value, if state $s_{t+1}$ reached using action $\alpha_t$ is an end state, or otherwise to determine it as a function of the Q value. It may be provided that the learning unit is designed to limit the value of Q function $Q_{target}$ using lower barrier LB or upper barrier UB.

For a training of first artificial neural network 204, a cost function may be defined as a function of Q value $Q(s_t, \alpha_t)$ at an output of second artificial neural network 206:

$$-Q(s_t,\alpha_t)$$

The goal of the training in the example is to learn parameters of first artificial neural network 204 for which this cost function has a lesser value than for other parameters. Due to the definition of Q value $Q(s_t, \alpha_t)$, this is itself negative in the example. This cost function is therefore minimized in the example in a gradient descent method.

In the following, a training of first artificial neural network 204 and second artificial neural network 206 is described. An Adam optimizer may be used for the training.

First artificial neural network 204, i.e., the actor network, includes three completely connected layers in the example, in which two concealed layers each include 100 neurons. First artificial neural network 204 includes an input layer for forces and moments which specify state $s_t$. In the example, estimated variables $\hat{\zeta}=[\hat{f}_x\ \hat{f}_y\ \hat{f}_z\ \hat{\tau}_x\ \hat{\tau}_y\ \hat{\tau}_z]$ are used. The forces and moments may be mapped linearly in the example on values of a state description in an interval $[-1,+1]$. First artificial neural network 204 includes an output layer for forces and moments which define an action $\alpha_t$. In the example, the layers include tanh activation functions. The weights for the layers may be randomly initialized, in particular by a Glorot uniform distribution. An output of the output layer defines in the example manipulated variable $\zeta=[f_x\ f_y\ f_z\ \tau_x^r\ \tau_y^r\ \tau_z^r]$ for action $\alpha_t$. In the example, the output layer is two-dimensional. The first output defines in the example moment $\tau_x^r$ in the x direction. The second output defines in the example moment $\tau_y^r$ in the y direction. In the example, first part $f_x\ f_y\ f_z$ of manipulated variable $\zeta=[f_x\ f_y\ f_z\ \tau_x^r\ \tau_y^r\ \tau_z^r]$ is predefined constantly regardless of first artificial neural network 204, for example $f_x=0$, $f_y=0$, $f_z=-15$, $\tau_z^r=0$. The first output and the second output define the second part of manipulated variable $\zeta=[f_x\ f_y\ f_z\ \tau_x^r\ \tau_y^r\ \tau_z^r]$.

Second artificial neural network 206, i.e., the critic network, includes in the example three completely connected layers, in which two concealed layers each include 100 neurons. Second artificial neural network 206 includes an input layer for forces and moments which indicate state $s_t$ and action $\alpha_t$. The forces and moments may be mapped in the example linearly on values of a state description in an interval $[-1,+1]$. Second artificial neural network 206 includes a one-dimensional output layer. In the example, the output layer does not include a nonlinearity, in particular does not include an activation function. Q value $Q(s_t, \alpha_t)$ is output at the output of second artificial neural network 206. The other layers include ReLU activation functions in the example. The weights for the layers may be randomly initialized, in particular by an He uniform distribution.

In the training, moving gripping device 108 out of a starting pose may be provided. The starting pose may be, for example, one of 8 possible predefined starting poses. An episode of the training was either ended in the example when the end state was reached or after a predefined number of processing steps t=T, for example T=1000. In the example, training was carried out in a predefined number of episodes, for example 40 episodes. The weights of first artificial neural network 204 and/or second artificial neural network 206 were determined in the example in the episode according to a predefined number of processing steps t=N, for example N=20. A test phase may be carried out after the training. In the test phase, a predefined number of episodes, in the example 8 episodes, may be carried out. The starting pose may differ in the test phase from the starting pose or the starting poses from the training.

In the training, different actions $\alpha_t$ are carried out by first artificial neural network 204 as a function of its weights. In the training, different values of Q function $Q_{target}$ are carried out by second artificial neural network 206 as a function of its weights. The training is carried out in the example starting from adapting the weights of first artificial neural network 204 and/or second artificial neural network 206. The goal of the training is, for example, to adapt the weights of first artificial neural network 204 and/or second artificial neural network 206 in such a way that due to an action $\alpha_t$, which first artificial neural network 204 determines, a value of Q function $Q_{target}$, which second artificial neural network 206 determines, assumes a greater value than the value for other weights. For example, the weights of first artificial neural network 204 and/or second artificial neural network 206 are determined, for which the value of Q function $Q_{target}$ assumes a maximum value. For the adaptation of the weights, in the example a cost function is used, which is defined as a function of the weights of first artificial neural network 204 and/or second artificial neural network 206.

The cost function is defined in the example as a function of the output of first artificial neural network 204 and second artificial neural network 206. The weights of first artificial neural network 204 and/or second artificial neural network 206 are adapted in the example as a function of a value of a gradient for the cost function and a learning rate, which defines which effect the value of the gradient of the cost function has on individual ones of these weights. A selection of different learning rates for first artificial neural network 204 and for the second artificial neural network may be provided. Preferably, a first learning rate of first artificial neural network 204 is less than a second learning rate of second artificial neural network 206. It is advantageous if the first learning rate is less by a factor of 10 than the second learning rate.

In addition to the first learning rate and the second learning rate, the above-mentioned predefined numbers of processing steps and/or episodes may also be varied as hyperparameters for the training.

The first reward function is preferably used, since it manages using less processing memory. This is advantageous in particular in an embedded system. The first reward function is a spare rewards function, which is generally simpler to define than the second reward function. A user in a factory may thus complete the training faster. This is advantageous in particular in the industrial environment in which a robot 102 is to be trained for a task.

The following advantages may be achieved in the training by this method over the method according to deep deterministic policy gradients:

higher robustness with respect to changes in the hyperparameters, more reliably reaching the end state, less variance with respect to the initialization of the weights using different random seeds, higher robustness with respect to a change of the reward function, higher robustness with respect to restricted memory, for example in embedded systems, safer exploration.

Figure 3:
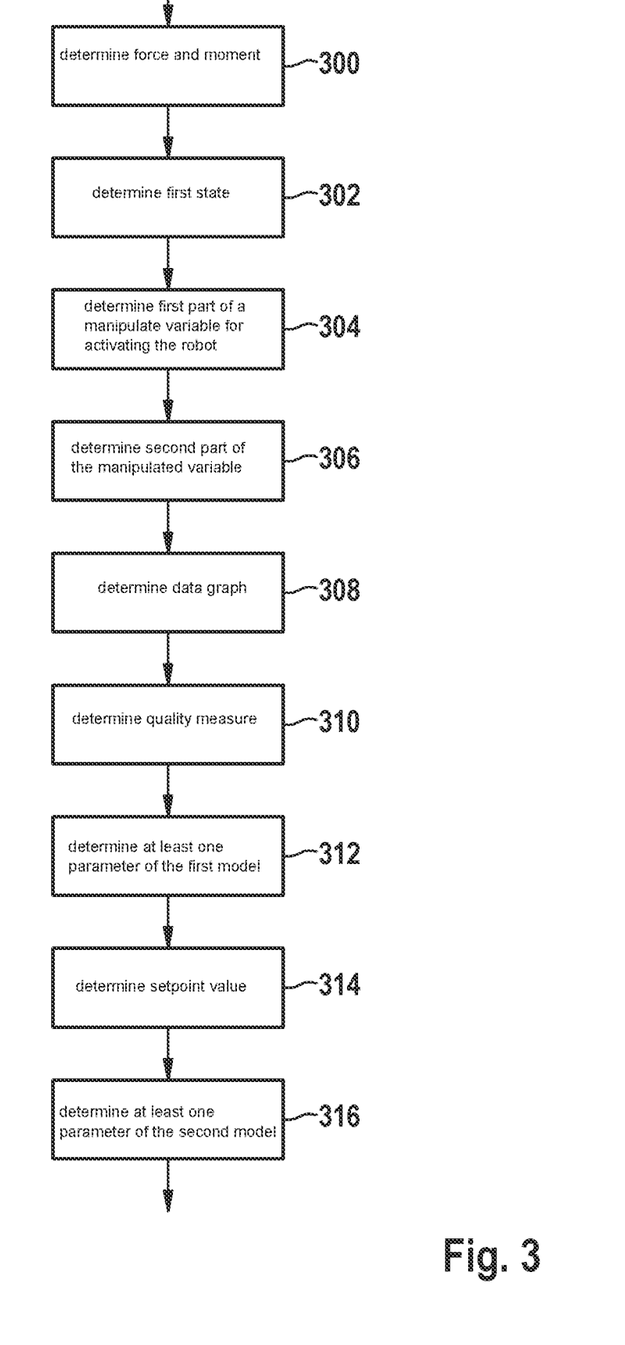
FIG. 3 shows steps and a method for operating the robot, in accordance with an example embodiment of the present invention.

FIG. 3 schematically shows steps and a method for operating robot 102.

In a step 300, at least one force and at least one moment are determined which act on an end effector 108 robot 102. It may be provided that estimated variables $\hat{\zeta}=[\hat{f}_x\ \hat{f}_y\ \hat{f}_z\ \hat{\tau}_x\ \hat{\tau}_y\ \hat{\tau}_z]$ are determined or corresponding variables as described are determined.

In a step 302, first state $s_t$ is determined as a function of the at least one force and the at least one moment.

First state $s_t$ is defined in the example with respect to an axis, a force causing a movement of end effector 108 in the direction of the axis, a moment causing a rotation of end effector 108 around the axis.

In the example, a vector is determined which defines first state $s_t$, the vector defining a first force, a second force, a third force, a first moment, a second moment, and a third moment, different axes being defined for the forces, a different one of the different axes being associated with each moment. The vector is defined, for example, by estimated variables $\hat{\zeta}=[\hat{f}_x\ \hat{f}_y\ \hat{f}_z\ \hat{\tau}_x\ \hat{\tau}_y\ \hat{\tau}_z]$.

In a step 304, as a function of a first state $s_t$ of robot 102 and/or its surroundings and as a function of an output of a first model, a first part of a manipulated variable for activating robot 102 for a transition from first state $s_t$ into second state $s_{t+1}$ of robot 102 is determined.

The first model includes, for example, first artificial neural network 204. A first part of the vector defines in the example the input for first artificial neural network 204 for determining the first part of the manipulated variable. The input of first artificial neural network 204 is defined in the example regardless of a second part of the vector.

In a step 306, a second part of the manipulated variable is determined as a function of first state $s_t$ and regardless of the first model.

In the example, a vector is determined which defines the manipulated variable. The vector includes a first force, a second force, a third force, a first moment, a second moment, and a third moment, wherein different axes are defined for the forces. A different one of the different axes is associated with each moment.

A first part of the vector is defined in the example regardless of an output of first artificial neural network 204, in particular as constant.

A second part of the vector is defined in the example as a function of the output of first artificial neural network 204.

In the example, the vector is determined as described for manipulated variable $\zeta=[f_x\ f_y\ f_z\ \tau_x^r\ \tau_y^r\ \tau_z^r]$.

In a step 308, the data graph is determined as a function of at least one state of robot 102. In the example, the last transition which has taken place is used to supplement the data graph. A node which represents a leaf in the data graph and which is not associated with an end state of robot 102 may be associated with an edge which defines an action without consequences. The action without consequences is optionally associated with a value, which is in particular constant, for the first part of the manipulated variable.

In a step 310, a quality measure is determined as a function of the first state and as a function of the output of the first model using a second model.

In the example, the second model includes second artificial neural network 206. In the example, the vector defines the input for second artificial neural network 206. In the example, the output of second artificial neural network 206 defines the quality measure.

In a step 312, at least one parameter of the first model is determined as a function of the quality measure. For this purpose, the training is carried out as described above for first artificial neural network 204.

In a step 314, a setpoint value is determined as a function of a reward which is associated with the transition from the first state into the second state.

The setpoint value is determined in the example as a function of a barrier. The barrier is determined as a function of the data graph. In the example, the subgraph of the graph is determined as a function of the first state and the barrier is determined as described as a function of the Q values which are associated with the nodes of the subgraphs.

In an optional step 314, it is provided that the setpoint value is determined as a function of a predefined barrier which takes into consideration domain knowledge dependent on the task.

In a step 316, at least one parameter of the second model is determined as a function of the quality measure and the setpoint value. For this purpose, the training is carried out as described above for second artificial neural network 206.

The steps of the method may be repeated in this or a different sequence for multiple episodes and/or epochs to train first artificial neural network 204 according to the optimum strategy to maximize the Q value of second artificial neural network 206.

It may be provided that robot 102 is activated as a function of manipulated variable $\zeta$, which is determined by the optimum strategy.

End effector 108 may include at least one finger 114, which includes a section complementary to first workpiece 106 and the surface of which is designed to be self-centering. A particularly good hold at constant pressure downward is thus enabled. The self-centering is also particularly important at high moments which do not act vertically downward with respect to the workspace 110. Twisting of the object which is otherwise possible may thus be avoided.

What is claimed is:

1. A method for operating a robot, comprising the following steps:
   determining, as a function of a first state of the robot and/or surroundings of the robot, and as a function of an output of a first model, a first part of a manipulated variable for activating the robot for a transition from the first state into a second state of the robot;
   determining a second part of the manipulated variable as a function of the first state and regardless of the first model;
   determining a quality measure as a function of the first state and as a function of the output of the first model using a second model;
   determining at least one parameter of the first model as a function of the quality measure;
   determining at least one parameter of the second model as a function of the quality measure and a setpoint value, the setpoint value being determined as a function of a reward, which is associated with the transition from the first state into the second state.

2. The method as recited in claim 1, wherein at least one force and at least one moment are determined, which act on an end effector of the robot, the first state and/or the second state being determined as a function of the at least one force and the at least one moment.

3. The method as recited in claim 2, wherein the first state and/or the second state is defined with respect to an axis, the force causing a movement of the end effector in a direction of the axis, the moment causing a rotation of the end effector around the axis.

4. The method as recited in claim 3, wherein a vector is determined which defines a constant part of the manipulated variable, the vector defining a first force, a second force, a third force, a first moment, a second moment, and a third moment, different axes being defined for the forces, a different one of the different axes being associated with each moment.

5. The method as recited in claim 4, wherein the first model includes a first function approximator, the first function approximator including a first Gaussian process or a first artificial neural network, a first part of the vector defining an input for the first function approximator, the input being defined independently of a second part of the vector.

6. The method as recited in claim 5, wherein the second model includes a second function approximator, the second function approximator including a second Gaussian process or a second artificial neural network, the vector defining an input for the second function approximator.

7. The method as recited in claim 6, wherein, for a training of the first artificial neural network, a cost function is determined as a function of an output of the second artificial neural network, parameters of the first artificial neural network being learned in the training for which the cost function has a lesser value than for other parameters.

8. The method as recited in claim 6, wherein in a training for the second artificial neural network, for an output of the second artificial neural network, a cost function is defined as a function of the output of the second artificial neural network and the setpoint value, parameters of the second artificial neural network being learned for which the cost function has a lesser value than for other parameters.

9. The method as recited in claim 3, wherein a vector is determined which defines the manipulated variable, the vector defining a first force, a second force, a third force, a first moment, a second moment, and a third moment, different axes being defined for the first, second, and third forces, a different one of the different axes being associated with each of the first, second, and third moments, a first part of the vector being defined, independently of an output of a first artificial neural network which includes the first model, to be constant, a second part of the vector being defined as a function of the output of the first artificial neural network.

10. The method as recited in claim 2, wherein the end effector includes at least one finger, which includes a section complementary to a workpiece, the surface of which is nonslip or self-centering.

11. The method as recited in claim 1, wherein the setpoint value is determined as a function of a barrier, the barrier being determined as a function of a graph in which a node defines a state of the robot, a subgraph of the graph, which includes a first node that represents the first state, being determined as a function of the first state, the barrier being determined as a function of values which are associated with nodes of the subgraph which includes a path from the first node to a second node, which represents an end state for the robot.

12. The method as recited in claim 11, wherein the graph is determined as a function of at least one state of the robot, an edge which defines an action without consequences being associated with a node which represents a leaf in the graph and which is not associated with the end state of the robot.

13. The method as recited in claim 12, wherein the action without consequences is associated with a value, which is constant, for the first part of the manipulated variable, the changed parts of a residual policy thus remaining unconsidered for the determination of the barrier.

14. The method as recited in claim 1, wherein the setpoint value is determined as a function of a predefined barrier.

15. A device for operating a robot, wherein the device is configured to:

determine, as a function of a first state of the robot and/or surroundings of the robot, and as a function of an output of a first model, a first part of a manipulated variable for activating the robot for a transition from the first state into a second state of the robot;

determine a second part of the manipulated variable as a function of the first state and regardless of the first model;

determine a quality measure as a function of the first state and as a function of the output of the first model using a second model;

determine at least one parameter of the first model as a function of the quality measure;

determine at least one parameter of the second model as a function of the quality measure and a setpoint value, the setpoint value being determined as a function of a reward, which is associated with the transition from the first state into the second state.

16. A non-transitory computer-readable medium on which is stored a computer program including instructions for operating a robot, the computer program, when executed by a computer, causing the computer to perform the following steps:

determining, as a function of a first state of the robot and/or surroundings of the robot, and as a function of an output of a first model, a first part of a manipulated variable for activating the robot for a transition from the first state into a second state of the robot;

determining a second part of the manipulated variable as a function of the first state and regardless of the first model;

determining a quality measure as a function of the first state and as a function of the output of the first model using a second model;

determining at least one parameter of the first model as a function of the quality measure;

determining at least one parameter of the second model as a function of the quality measure and a setpoint value, the setpoint value being determined as a function of a reward, which is associated with the transition from the first state into the second state.

* * * * *